(12) United States Patent
Isotani et al.

(10) Patent No.: US 9,714,079 B2
(45) Date of Patent: Jul. 25, 2017

(54) HIGH-LIFT DEVICE OF AIR VEHICLE

(71) Applicants: THE SOCIETY OF JAPANESE AEROSPACE COMPANIES, Tokyo (JP); KAWASAKI JUKOGYO KABUSHIKI KAISHA, Kobe-shi, Hyogo (JP)

(72) Inventors: Kazuhide Isotani, Kakamigahara (JP); Kenji Hayama, Kakamigahara (JP)

(73) Assignees: THE SOCIETY OF JAPANESE AEROSPACE COMPANIES, Tokyo (JP); KAWASAKI JUKOGYO KABUSHIKI KAISHA, Kobe (JP)

( * ) Notice: Subject to any disclaimer, the term of this patent is extended or adjusted under 35 U.S.C. 154(b) by 16 days.

(21) Appl. No.: 14/389,257

(22) PCT Filed: Mar. 29, 2013

(86) PCT No.: PCT/JP2013/002174
§ 371 (c)(1),
(2) Date: Sep. 29, 2014

(87) PCT Pub. No.: WO2013/145774
PCT Pub. Date: Oct. 3, 2013

(65) Prior Publication Data
US 2015/0053825 A1     Feb. 26, 2015

(30) Foreign Application Priority Data
Mar. 29, 2012   (JP) ................................ 2012-077712

(51) Int. Cl.
*B64C 3/58*   (2006.01)
*B64C 3/50*   (2006.01)
(Continued)

(52) U.S. Cl.
CPC .................. *B64C 3/50* (2013.01); *B64C 9/02* (2013.01); *B64C 9/18* (2013.01); *B64C 21/08* (2013.01);
(Continued)

(58) Field of Classification Search
None
See application file for complete search history.

(56) References Cited

U.S. PATENT DOCUMENTS 2,492,245 A  * 12/1949  Sutton ..................... B64C 21/08
                                                                            244/13
4,131,252 A    12/1978  Dean et al.
(Continued)

FOREIGN PATENT DOCUMENTS

EP       0230061 A1    7/1987
EP       2746152 A2    6/2014
(Continued)

OTHER PUBLICATIONS

Oct. 20, 2015 Extended European Search Report issued in European Patent Application No. 13768891.7.
(Continued)

*Primary Examiner* — Medhat Badawi
(74) *Attorney, Agent, or Firm* — Oliff PLC

(57) ABSTRACT

A high-lift device includes a flap body which is provided at a rear portion of a main wing which generates a lift for the air vehicle such that the flap body is deployed with respect to the main wing and stowed in the main wing and extends along a wingspan direction of the main wing; and a gap increasing section provided at an end portion of the flap body in an extending direction of the flap body, to increase a gap between the rear portion of the main wing and a front portion of the flap body in a state in which the flap body is deployed.

1 Claim, 13 Drawing Sheets

(51) Int. Cl.
*B64C 9/18* (2006.01)
*B64C 9/02* (2006.01)
*B64C 21/08* (2006.01)
*B64C 9/14* (2006.01)

(52) U.S. Cl.
CPC .... *B64C 2009/143* (2013.01); *B64C 2230/14* (2013.01); *Y02T 50/166* (2013.01)

(56) References Cited

U.S. PATENT DOCUMENTS

| | | | | |
|---|---|---|---|---|
| 4,836,473 A | * | 6/1989 | Aulehla | B64C 21/00 244/130 |
| 5,178,348 A | * | 1/1993 | Bliesner | B64C 3/14 244/200 |
| 5,738,298 A | * | 4/1998 | Ross | B64C 7/00 244/1 N |
| 6,491,260 B2 | * | 12/2002 | Borchers | B64C 21/10 244/199.1 |
| 7,484,930 B2 | * | 2/2009 | Hutcheson | B64C 21/04 415/119 |
| 7,753,316 B2 | * | 7/2010 | Larssen | B64C 7/00 244/199.4 |
| 7,874,524 B2 | * | 1/2011 | Lee | B64C 3/58 244/199.4 |
| 8,757,556 B2 | * | 6/2014 | Rist | B64C 21/025 244/204.1 |
| 2009/0084905 A1 | * | 4/2009 | Mau | B64C 9/20 244/207 |
| 2009/0200431 A1 | * | 8/2009 | Konings | B64C 3/385 244/213 |
| 2010/0294883 A1 | * | 11/2010 | Trich s, Jr. | B64C 9/18 244/1 N |
| 2011/0114795 A1 | * | 5/2011 | Voss | B64C 9/18 244/213 |
| 2012/0223190 A1 | * | 9/2012 | Rist | B64C 21/025 244/208 |
| 2014/0217236 A1 | * | 8/2014 | Bonatto | B64C 7/00 244/1 N |

FOREIGN PATENT DOCUMENTS

| | | |
|---|---|---|
| JP | S62-173398 A | 7/1987 |
| JP | A-62-299496 | 12/1987 |
| JP | 2009-527405 A | 7/2009 |
| WO | 03/013956 A1 | 2/2003 |

OTHER PUBLICATIONS

International Search Report issued in International Application No. PCT/JP2013/002174 dated Jun. 25, 2013.
Feb. 10, 2017 Office Action issued in European Patent Application No. 13 768 891.7.

* cited by examiner

Sound pressure spectrum distribution

Sound pressure level (overall) of Embodiment 1
(Change amount from basic shape)

Sound pressure level (overall) of Embodiment 2
(Change amount from basic shape)

__

HIGH-LIFT DEVICE OF AIR VEHICLE

TECHNICAL FIELD

The present invention relates to a high-lift device which is provided in a trailing edge portion of a main wing of an air vehicle (aircraft) such that the high-lift device can be deployed with respect to and stowed in the main wing.

BACKGROUND ART

An air vehicle includes a high-lift device provided in a main wing. The high-lift device is stowed in the main wing during cruising and deployed with respect to the main wing during takeoff and landing. The high-lift device is an aerodynamic device for ensuring a lift (aerodynamic lift) during low-speed flight, and therefore is designed so that an emphasis is put on aerodynamic characteristics.

In recent years, demands for reduction of noise radiated from an air vehicle during takeoff and landing have been increasing. Under the circumstances, a high-lift device is regarded as one of major noise sources, particularly during landing. Accordingly, there has been proposed a high-lift device intended to reduce aerodynamic noise. For example, Patent Literature 1 discloses a noise reduction device configured to blow air through slots which are open in the top surface, side surface, and bottom surface of the main wing.

CITATION LIST

Patent Literature

Patent Literature 1: U.S. Pat. No. 7,484,930

SUMMARY OF INVENTION

Technical Problem

According to this noise reduction device, it is required that a pneumatic source be positioned in the vicinity of the main wing, to blow the air. When a dedicated compressor is used as the pneumatic source, the whole device becomes large in size, and the weight of a fuselage increases. In addition, it is necessary to provide pipes for guiding air from the pneumatic source to the slots, inside a flap. Such a complex mechanism may result in an increase in work required to maintain the fuselage, such as inspection or maintenance, in addition to an increase in the weight, which will degrade practical performance.

Accordingly, an object of the present invention is to suitably reduce aerodynamic noise radiated from a high-lift device, without substantially increasing the weight of a fuselage and without degrading practical performance.

Solution to Problem

According to the present invention, there is provided a high-lift device of an air vehicle, the high-lift device comprising: a flap body which is provided at a rear portion of a main wing which generates a lift for the air vehicle such that the flap body is deployed with respect to the main wing and stowed in the main wing and extends (is elongated) along a wingspan direction of the main wing; and a gap increasing section provided at an end portion of the flap body in an extending direction of the flap body, to increase a gap between the rear portion of the main wing and a front portion of the flap body in a state in which the flap body is deployed.

A leading edge portion of the end portion of the flap body in the extending direction may be located rearward relative to a leading edge portion of a portion (remaining portion) of the flap body which portion is other than the end portion, a chord direction dimension of the end portion in the extending direction may be set smaller than a chord direction dimension of a portion in the vicinity of the end portion in the extending direction, and the gap increasing section may be formed by a gap formed forward relative to the leading edge portion of the end portion of the flap body in the extending direction.

The leading edge portion of the end portion of the flap body in the extending direction may have a shape in which an upper portion thereof is depressed relative to the leading edge portion of the portion of the flap body which portion is other than the end portion to form a recess, and the gap increasing section may be formed by the recess.

When a chord direction dimension of a portion of the flap body, which portion is in the vicinity of the end portion in the extending direction, is L, a wingspan direction dimension of the gap increasing section in a case where the gap increasing section is seen from a direction perpendicular to a main surface of the flap body, may be equal to or less than 100% of the dimension L, and a chord direction dimension of the gap increasing section in a case where the gap increasing section is seen from the direction perpendicular to the main surface of the flap body, may be equal to or less than 30% of the dimension L.

Advantageous Effects of Invention

In accordance with the present invention, it becomes possible to suitably reduce aerodynamic noise radiated from a high-lift device without substantially increasing the weight of a fuselage and degrading practical performance.

DESCRIPTION OF EMBODIMENTS

In a state in which a flap body is deployed with respect to a main wing, a vortex swirling from a lower surface side of a tip end portion in a span direction (wingspan direction) which is an extending direction of the flap body to an upper surface side thereof, is formed, in the vicinity of the surface of the tip end portion. It is considered that this vortex is a cause of generation of aerodynamic noise. Accordingly, the present inventors conceived that the aerodynamic noise radiated from the high-lift device can be reduced effectively by weakening vortex strength, and invented a high-lift device of an air vehicle of the present application.

Hereinafter, embodiments of the present invention will be described with reference to the drawings. Hereinafter, it is assumed that a fuselage (body of air vehicle) extends in a forward and rearward direction with its nose being at a front side. Throughout the drawings, the same or corresponding components are identified by the same reference symbols and will not be described repeatedly.

Main Wing and High-Lift Device

Figure 1:
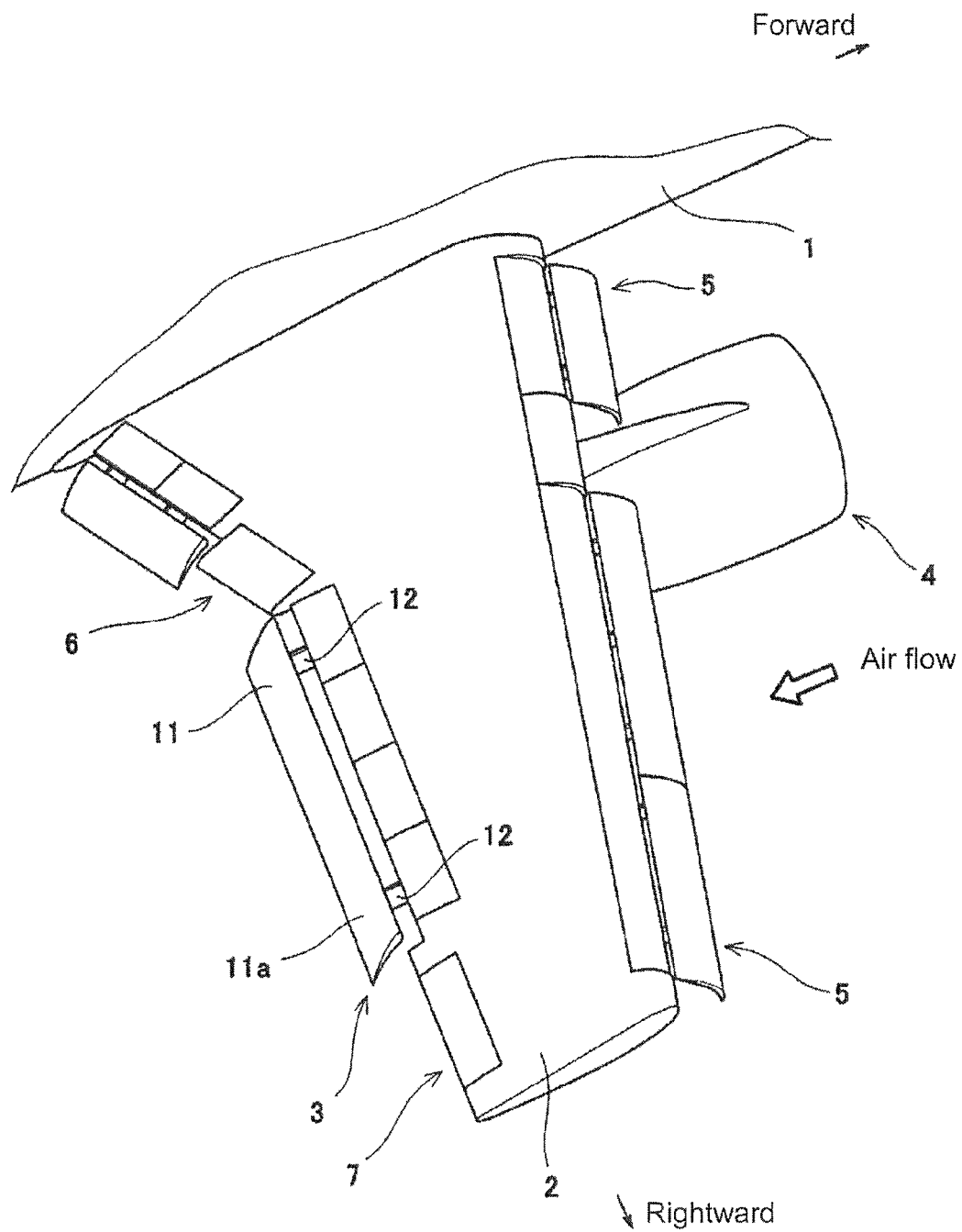
FIG. 1 is a perspective view showing the schematic configuration of a high-lift device of an air vehicle of the present invention.

FIG. 1 is a perspective view showing the schematic configuration of a high-lift device 3 of an air vehicle of the present invention. As shown in FIG. 1, the air vehicle includes a fuselage 1 extending in the forward and rearward direction, a pair of right and left main wings 2 (only right main wing is shown in FIG. 1), and high-lift devices 3. The pair of main wings 2 extend leftward and rightward from the fuselage 1, respectively. Each of the high-lift devices 3 is mounted to the trailing edge portion of the main wing 2. In the present embodiment, the high-lift device 3 is of a slotted flap type or of a Fowler flap type. The high-lift device 3 is stowed in or deployed with respect to the main wing 2. As shown in FIG. 1, a jet engine 4 is mounted to the main wing 2 of the air vehicle 1, slats 5 are provided at a leading edge portion thereof, an inner auxiliary wing 6, an outer auxiliary wing 7, and the like are provided at a trailing edge portion thereof.

The high-lift device 3 includes a flap body 11 and link mechanisms 12. The flap body 11 has a wing shape which is longer in a wingspan direction than in a chord direction. The wingspan direction of the flap body 11 is substantially parallel to the wingspan direction of the main wing 2. The link mechanisms 12 join the main wing 2 and the flap body 11 to each other. An actuator (not shown) activates the link mechanisms 12 to cause the flap body 11 to be stowed in and deployed with respect to the main wing 2.

In a state in which the flap body 11 is stowed in the main wing 2, the leading edge portion of the flap body 11 is stowed to be positioned under the trailing edge portion of the main wing 2. On the other hand, the trailing edge portion of the flap body 11 is exposed outside and constitutes a part of the trailing edge portion of the main wing 2. In a state in which the flap body 11 is deployed with respect to the main wing 2, the substantially entire portion of the flap body 11 protrudes rearward relative to the main wing 2 when viewed from above.

Figure 2:
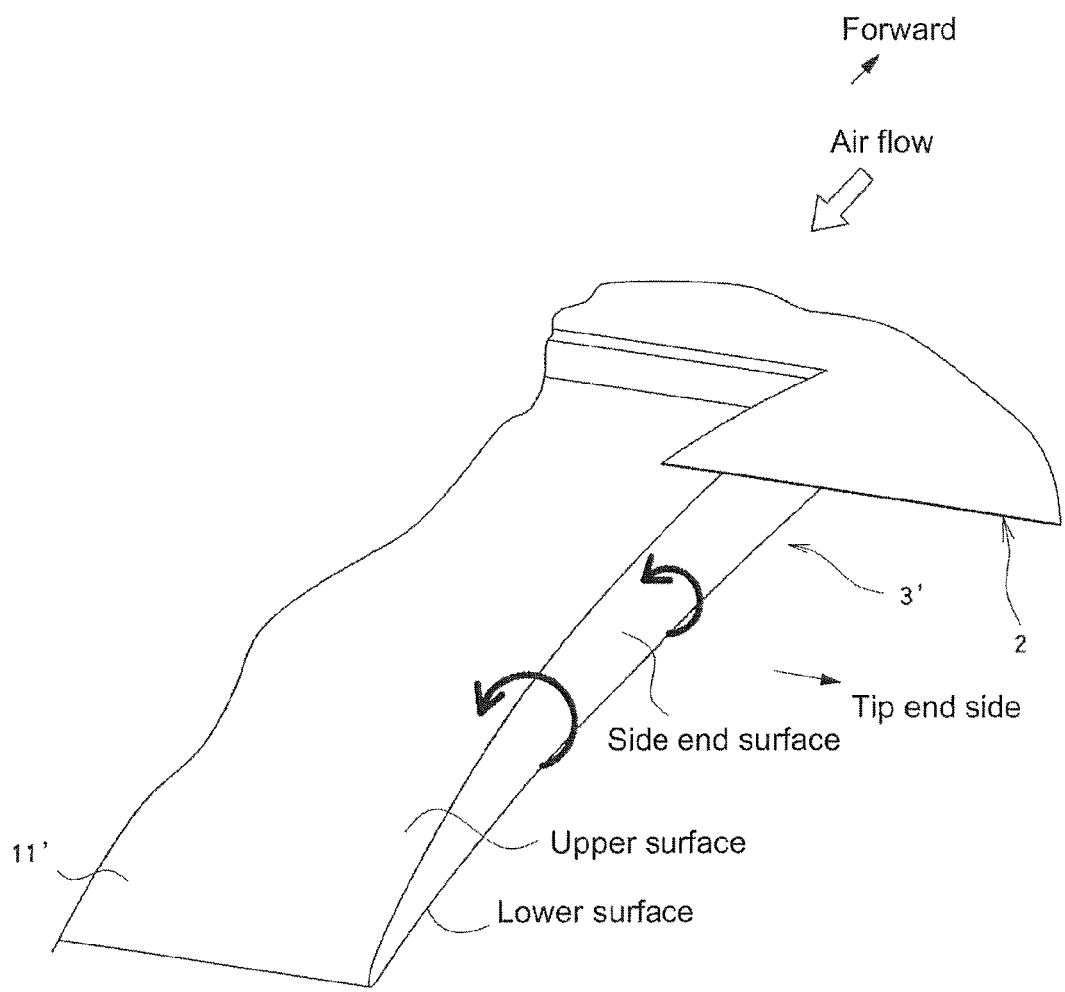
FIG. 2 is a perspective view of a high-lift device according to a prior art example.

FIG. 2 is a partial perspective view of a high-lift device 3' according to a prior art example, and shows a state in which a flap body 11' is deployed with respect to the main wing 2. At the tip end portion of the flap body 11' in the wingspan direction, due to a pressure difference between the upper surface side and the lower surface side, a vortex (indicated by solid-line arrows in FIG. 2) swirling from the lower surface side of the flap body 11' to the upper surface side thereof through a region facing a side end surface is generated. The position and strength of the vortex change with a passage of time. The swirling vortex interferes with the side end surface or upper surface of the flap body 11'. From this, it can be estimated that aerodynamic noise is radiated from the high-lift device 3' in the state in which the high-lift device 3' is deployed with respect to the main wing 2.

In light of the above, the high-lift device 3 of the present embodiment is configured to reduce a pressure difference between the upper surface side and lower surface side of a tip end portion 11a of the flap body 11. Specifically, the tip end portion 11a is provided with a gap increasing section for increasing a gap between the rear portion of the main wing 2 and the front portion of the flap body 3 in the deployed state. In a normal flap design, the gap is adjusted to optimize a lift generated in the flap body. Therefore, if this gap is increased to be larger than the adjusted dimension, airflow is locally separated from the upper surface and a pressure increases at the upper surface side of the tip end portion 11a. As a result, the pressure difference between the upper surface side and lower surface side of the tip end portion 11a decreases, the vortex swirling from the lower surface side to the upper surface side through the region facing the side end surface is weakened, and thus the aerodynamic noise is reduced. Hereinafter, the specific example of the high-lift device 3 including the above described gap increasing section will be described.

Embodiment 1: Shortened Leading Edge Form

Figure 3:
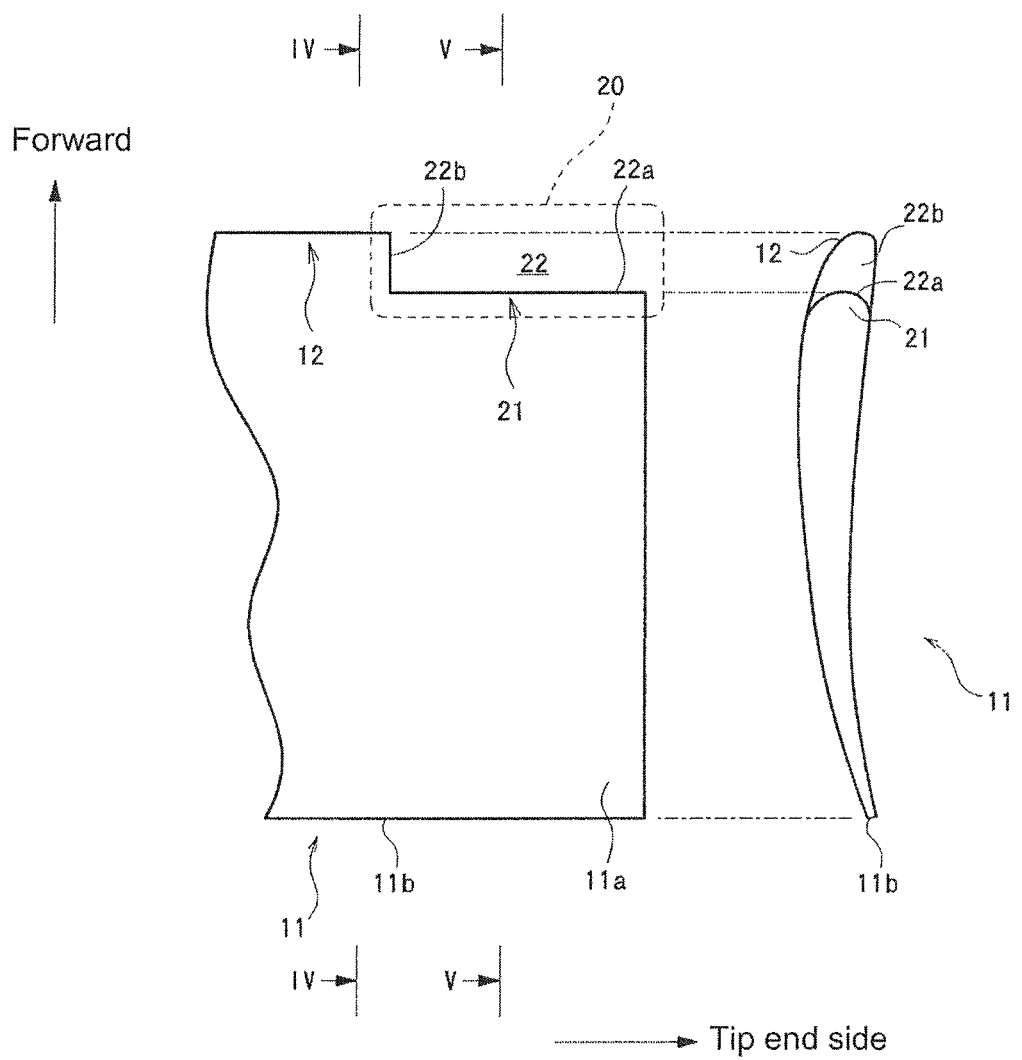
FIG. 3 is a plan view and a side view from the perspective of a tip end, showing the external appearance of the configuration of a flap body of the high-lift device according to Embodiment 1.

FIG. 3 is a plan view and a side view from the perspective of a tip end, showing the external appearance of the configuration of the flap body 11 of the high-lift device 3 according to Embodiment 1. The flap body 11 of FIG. 3 entirely has a rectangular shape which is elongated in the rightward and leftward direction (wingspan direction) when viewed from above. The tip end portion 11a in the wingspan direction is provided with a gap increasing section 20 formed by shortening its chord length. More specifically, a leading edge portion (hereinafter will be referred to as "tip end leading edge portion") 21 of the tip end portion 11a of the flap body 11 is located rearward relative to a leading edge portion (hereinafter will be referred to as "body leading edge portion") 12 of the remaining portion (portion other than the tip end portion 11a). In addition, the tip end portion 11a is smaller in chord direction dimension than a portion in the vicinity of the tip end portion 11a. The above gap increasing section 20 is formed by a space 22 formed forward relative to the tip end leading edge portion 21.

In other words, the space 22 forming the gap increasing section 20 is defined by a front end surface 22a of the tip end leading edge portion 21 and a tip end surface 22b of the remaining portion. In the present embodiment, a trailing edge portion 11b of the flap body 11 is continuous without a dimension difference over the entire wingspan (aligned trailing edge portion). Therefore, because of a positional difference between the leading edge portions 21, 12, the tip end portion 11a is shorter in chord length than the remaining portion.

The cross-sectional shape (shape of the cross-section perpendicular to the wingspan direction) of the tip end portion 11a of the flap body 11 may be a cross-sectional shape in which a contour at the upper surface side and a contour at the lower surface side are connected to each other at the leading edge portion with a curved contour. In the present embodiment, the cross-sectional shape of the tip end portion 11a is such that the leading edge portion has a circular-arc shape with a large diameter, its thickness decreases toward the trailing edge portion, and thus the tip end portion 11a is curved to protrude upward as a whole (see side view of FIG. 3).

Figure 4:
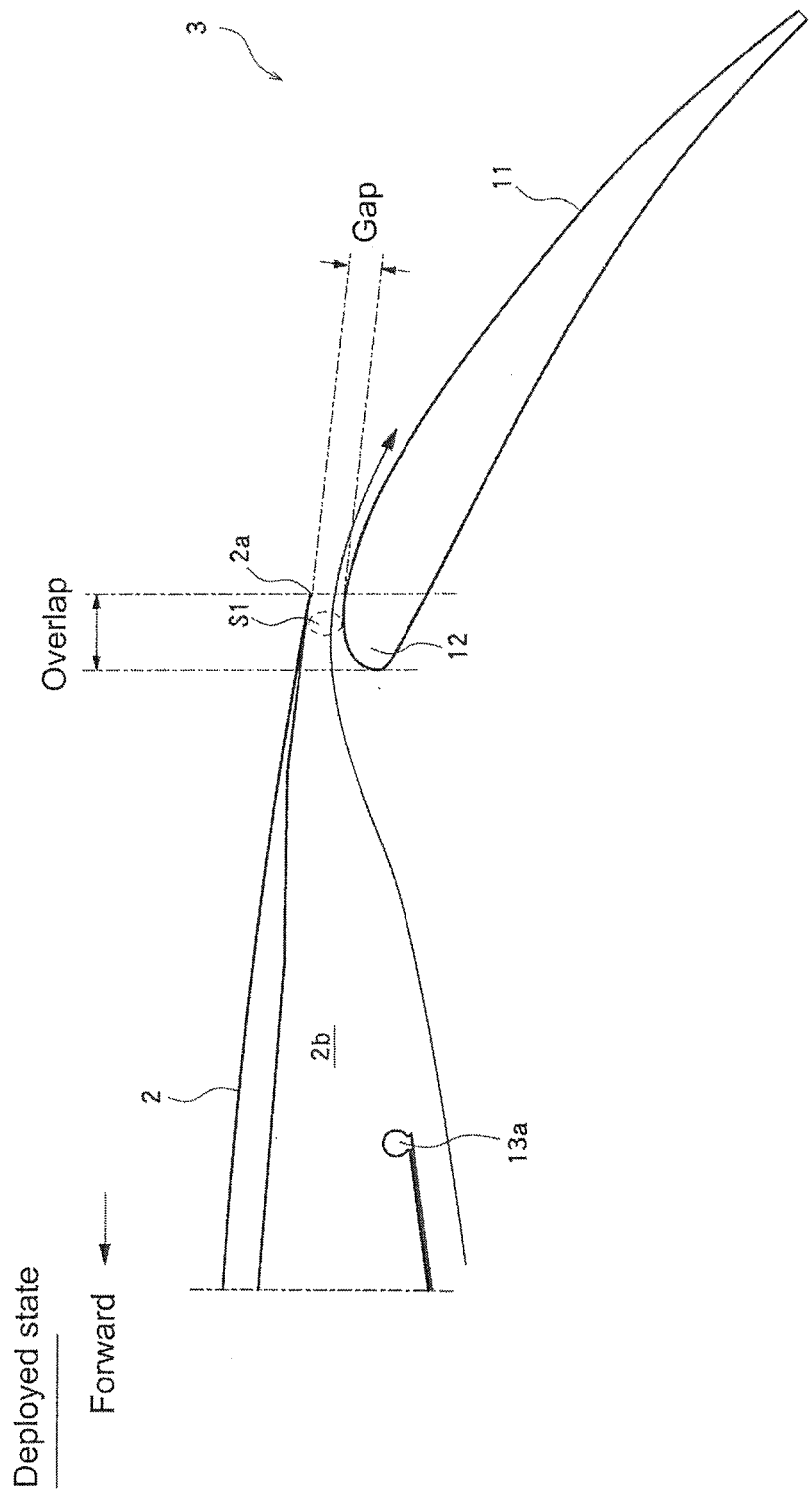
FIG. 4 is a view showing the high-lift device according to Embodiment 1, and showing the cross-section of a flap body taken in the direction of arrows IV-IV of FIG. 3.

FIG. 4 is a view showing the high-lift device 3 according to Embodiment 1. FIG. 4 is a cross-sectional view of the main wing 2 and is a cross-sectional view of the flap body 11 taken in the direction of arrows IV-IV of FIG. 3. FIG. 4 shows the state in which the flap body 11 is deployed with respect to the main wing 2.

Initially, airflow travelling through a space above the body leading edge portion 12 of the flap body 11 in the deployed state will be described (see solid-line arrow in FIG. 4).

In the state in which the flap body 11 is deployed, the body leading edge portion 12 is located forward relative to the trailing edge portion 2a (trailing edge portion of a portion stowing the flap body 11) of the main wing 2 in the chord direction. More specifically, the front end of the body leading edge portion 12 is located horizontally forward relative to the rear end of the trailing edge portion 2a of the main wing 2, and the front portion of the flap body 11 and the rear portion of the main wing 2 overlap with each other for a specified dimension. A gap with a specified dimension is formed between the upper surface of the body leading edge portion 12 and the lower surface of the trailing edge portion 2a of the main wing 2. In this configuration, a relatively narrow gap S1 is formed between the trailing edge portion 2a of the main wing 2 and the body leading edge portion 12 of the flap body 11.

In the present embodiment, for example, the specified dimension of the front portion of the flap body 11 and the rear portion of the main wing 2 which overlap with each other is measured on condition that the chord (line segment connecting the leading edge to the trailing edge) of the main wing 2 is a reference. The above gap dimension is measured on condition that a shortest distance between the trailing edge portion 2a of the main wing 2 and the surface of the body leading edge portion 12 is a reference.

Therefore, when the flap body 11 is deployed at the time of, for example, landing, the air flowing along the lower surface of the main wing 2 travels through the gap S1 and forms airflow travelling along the upper surface of the flap body 11 (see solid-line arrow in FIG. 4). The airflow travelling above the body leading edge portion 12 is high in velocity because it travels through the gap S1 formed by a relatively narrow gap. In addition, since the body leading edge portion 12 and the trailing edge portion 2a of the main wing 2 overlap with each other, the direction in which the airflow travels through the gap S1 is along the upper surface of the flap body 11. For this reason, on the upper surface of the flap body 11, airflow travelling along the flap surface is generated, and separation of the airflow is suppressed. Thus, in a portion of the flap body 11 which portion is other than the tip end portion 11a, a large lift is generated due to the gap adjusted properly.

Figure 5:
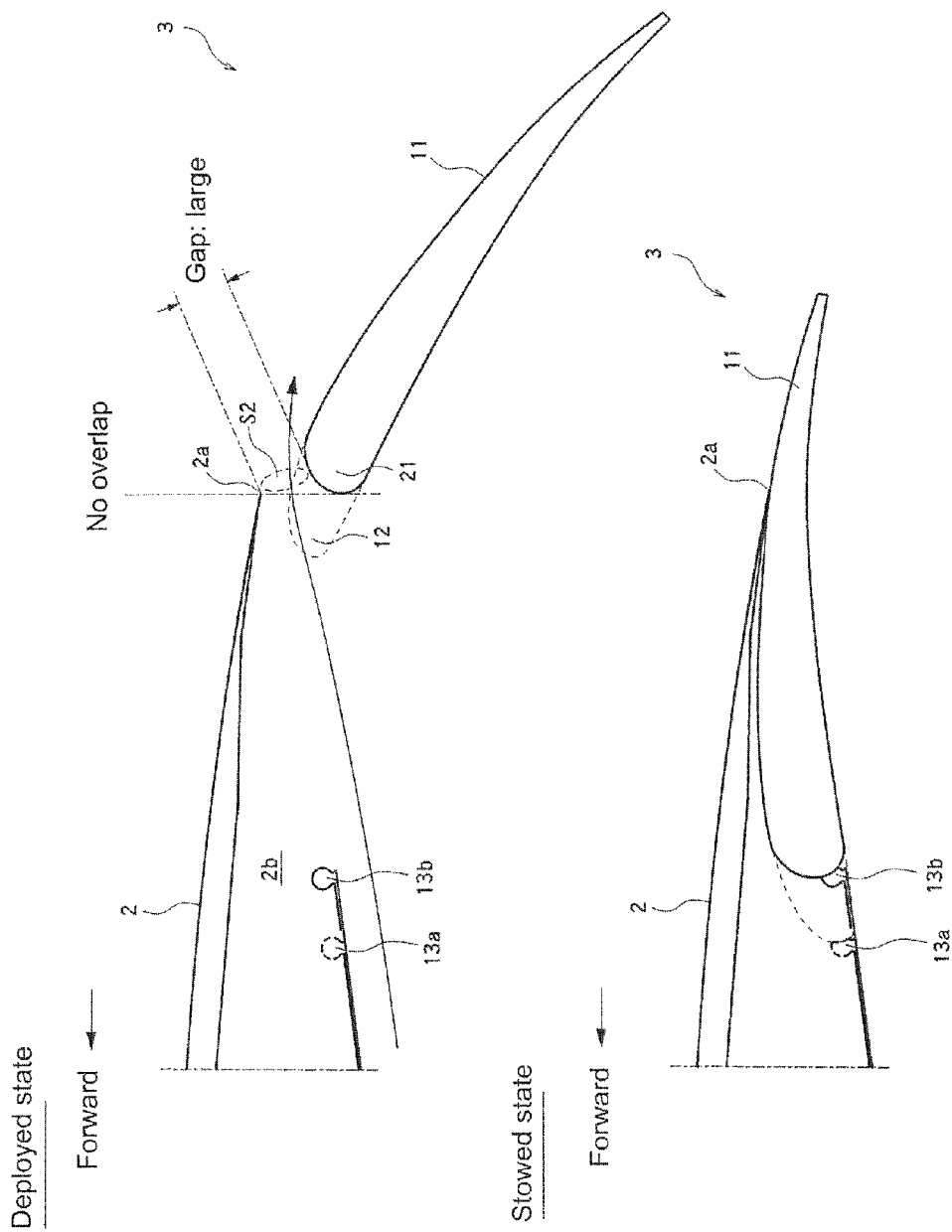
FIG. 5 is a view showing the high-lift device according to Embodiment 1, and showing the cross-section of a flap body taken in the direction of arrows V-V of FIG. 3.

Next, the airflow travelling above the tip end leading edge portion 21 of the flap body 11 will be described with reference to FIG. 5. FIG. 5 is a view showing the high-lift device 3 according to Embodiment 1. FIG. 5 is a cross-sectional view of the main wing 2 and is a cross-sectional view (cross-sectional view of the tip end portion 11a of the flap body 11) of the flap body 11 taken in the direction of arrows V-V of FIG. 3. On the upper side of FIG. 5, the state in which the flap body 11 is deployed with respect to the main wing 2, is shown, while on the lower side of FIG. 5, the state in which the flap body 11 is stowed in the main wing 2, is shown. A broken line indicates the contour of the body leading edge portion 12.

In the state in which the flap body 11 is deployed, the tip end leading edge portion 21 conforms to the trailing edge portion 2a of the main wing 2 or is located rearward relative to the trailing edge portion 2a in the chord direction. More specifically, the front end of the tip end leading edge portion 21 is located rearward by a dimension corresponding to the space 22. Therefore, the front end of the tip end leading edge portion 21 conforms to the rear end of the trailing edge portion 2a of the main wing 2 or is located rearward relative to the rear end of the trailing edge portion 2a in the chord direction, and the front portion of the flap body 11 and the rear portion of the main wing 2 do not overlap with each other. Since the front portion of the flap body 11 and the rear portion of the main wing 2 do not overlap with each other, there is formed a large gap between the upper surface of the tip end leading edge portion 21 and the lower surface of the trailing edge portion 2a of the main wing 2. Therefore, a relatively wide gap S2 is formed between the tip end leading edge portion 21 and the trailing edge portion 2a of the main wing 2.

When the flap body 11 is deployed at the time of, for example, landing, the air flowing along the lower surface of the main wing 2 travels through the gap S2, and forms airflow toward the upper surface of the flap body 11 (see solid-line arrow in FIG. 5). This airflow travels through the relatively wide gap S2, and therefore its flow velocity is lower than that in a case where the airflow travels through the gap S1. In addition, since there is no overlap between the tip end leading edge portion 21 of the flap body 11 and the trailing edge portion 2a of the main wing 2, the action for directing the airflow which has travelled through the gap S2, along the upper surface of the flap body 11, is lessened. Because of these effects, on the upper surface of the tip end portion 11a of the flap body 11, the airflow is locally separated and a pressure decrease is suppressed. Because of this, at the tip end portion 11a, the pressure difference between the upper surface side and the lower surface side becomes small, and hence vortex strength is reduced. As a result, the aerodynamic noise can be reduced.

As described above, since the flap body 11 has a shape in which a gap is made different between the tip end portion 11a and the remaining portion (portion other than the tip end portion 11a), the pressure difference between the lower surface side and the upper surface side can be made different between these portions. In the portion of the flap body 11 which is other than the tip end portion 11a, the gap is adjusted to increase a lift so that a lift can be increased effectively, which is an aim of the high-lift device. In contrast, in the tip end portion 11a, the gap is increased to be larger than that of the portion other than the tip end portion 11a so that a swirling vortex at the tip end portion 11a which is a noise source can be weakened. This makes it possible to effectively reduce the noise while suppressing effects on aerodynamic performance during takeoff and landing.

In FIGS. 4 and 5, reference symbol 13a indicates a seal member which contacts the front end of the body leading edge portion 12 when the flap body 11 is stowed in a stowing space 2b, and reference symbol 13b indicates a seal member which contacts the front end of the tip end leading edge portion 21 when the flap body 11 is stowed in a stowing space 2b. In the case of using the flap body 11 having the above described gap increasing section 20, a portion of the lower surface of the main wing 2, corresponding to the tip end leading edge portion 21 of the flap body 11, may be receded to the location of the seal member 13b. Thus, the contour of the whole wing in the state in which the flap body 11 is stowed in the space 2b is the same as that of the whole wing which is not provided with the gap increasing section 20. Therefore, the aerodynamic characteristic of the wing is not affected during the cruising.

Figure 6:
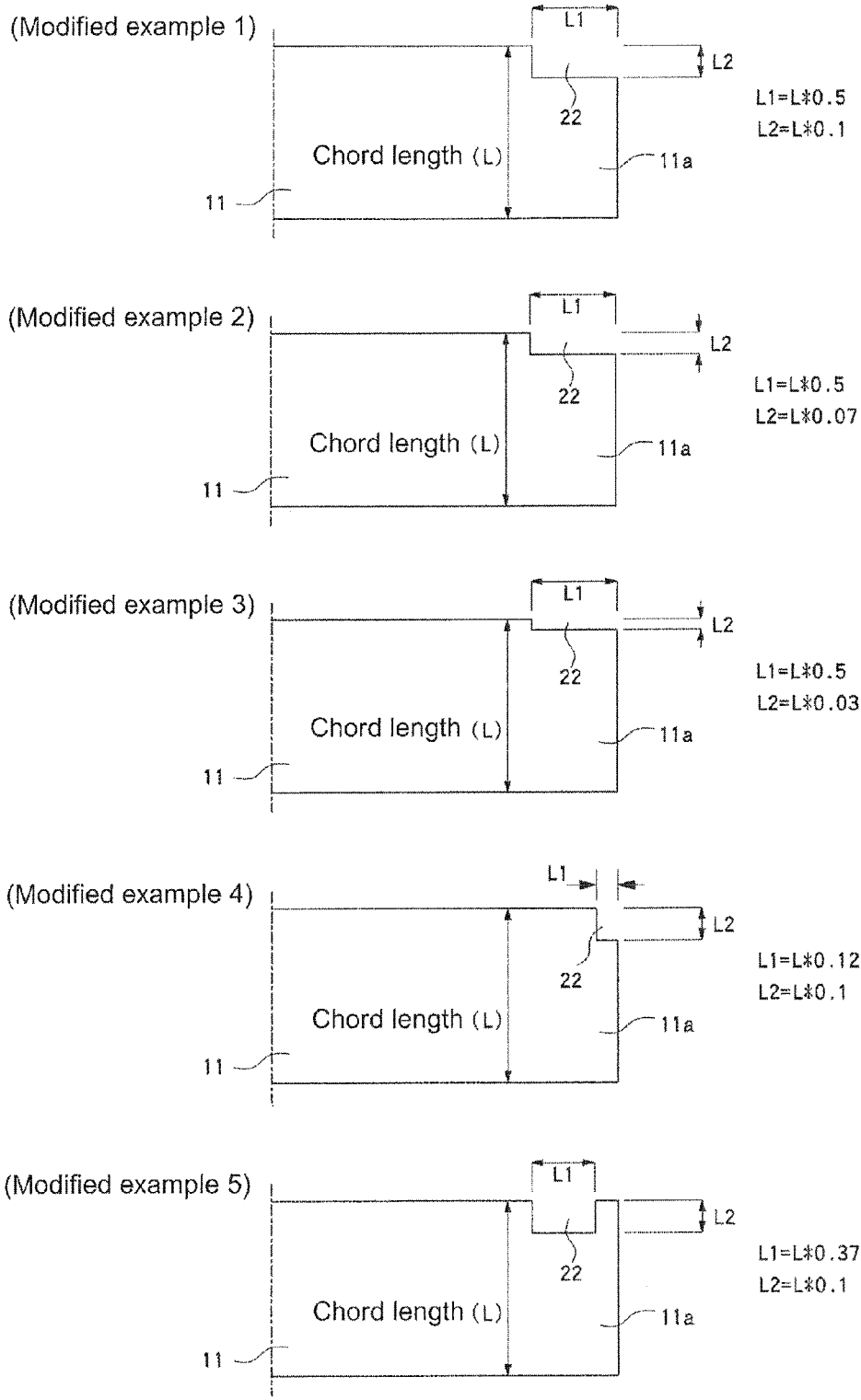
FIG. 6 is a plan view showing modified examples of Embodiment 1.

FIG. 6 is a plan view showing modified examples of Embodiment 1. For the gap increasing section 20 of the present embodiment, a wingspan direction dimension L1 of the space 22 (i.e., length of the tip end leading edge portion 21 in the wingspan direction), a chord direction dimension L2 of the space 22 (i.e., dimension of a difference in the chord direction between the tip end leading edge portion 21 and the body leading edge portion 12), and the location of the gap increasing section 20 can be set to various values.

Specifically, in the gap increasing section 20 of Modified example 1 of FIG. 6, the wingspan direction dimension L1 of the space 22 is set to about 50% of the chord length L which is closest to the tip end portion 11a of the flap body 11 and the chord direction dimension L2 of the space 22 is set to about 10% of the chord length L. This space 22 is open at its tip end.

In the gap increasing section 20 of Modified example 2, the wingspan direction dimension L1 of the space 22 is set equal to that of Modified example 1, and the chord direction dimension L2 of the space 22 is set to about 67% of that of Modified example 1 (about 7% of the chord length L). This space 22 is also open at its tip end.

In the gap increasing section 20 of Modified example 3, the wingspan direction dimension L1 of the space 22 is set equal to that of Modified example 1, and the chord direction dimension L2 of the space 22 is set to about 33% of that of Modified example 1 (about 3% of the chord length L). This space 22 is also open at its tip end.

In the gap increasing section 20 of Modified example 4, the wingspan direction dimension L1 of the space 22 is set to about 25% of that of Modified example 1 (about 12.5% of the chord length L), and the chord direction dimension L2 of the space 22 is equal to that of Modified example 1. This space 22 is also open at its tip end.

In the gap increasing section 20 of Modified example 5, the wingspan direction dimension L1 of the space 22 is set to about 37.5% of the chord length L, and the chord direction dimension L2 of the space 22 is set to about 10% of the chord length L. This space 22 is positioned closer to a base end portion than the end surface of the tip end portion 11a. Therefore, the tip end side is closed. Specifically, this space 22 is positioned such that the space 22 is deviated closer to the base end from the end surface of the tip end portion 11a of the flap body 11, by a distance of about 12.5% of the chord length L.

With the structures of these modified examples, a pressure decrease on the upper surface of the tip end portion 11a of the flap body 11, can be suppressed. This reduces the pressure difference between the lower surface side and the upper surface side of the tip end portion 11a. Therefore, it becomes possible to mitigate the vortex strength, or suppress generation of the vortex. As a result, the aerodynamic noise can be reduced. When a lift required for the flap body 11 is taken into account, the wingspan direction dimension L1 of the space 22 is more preferably set to 100% or less of the chord length L of a portion in the vicinity of the space 22, and the chord direction dimension L2 of the space 22 is more preferably set to 30% or less of the chord length L.

Embodiment 2: Cut Leading Edge Upper Surface

Figure 7:
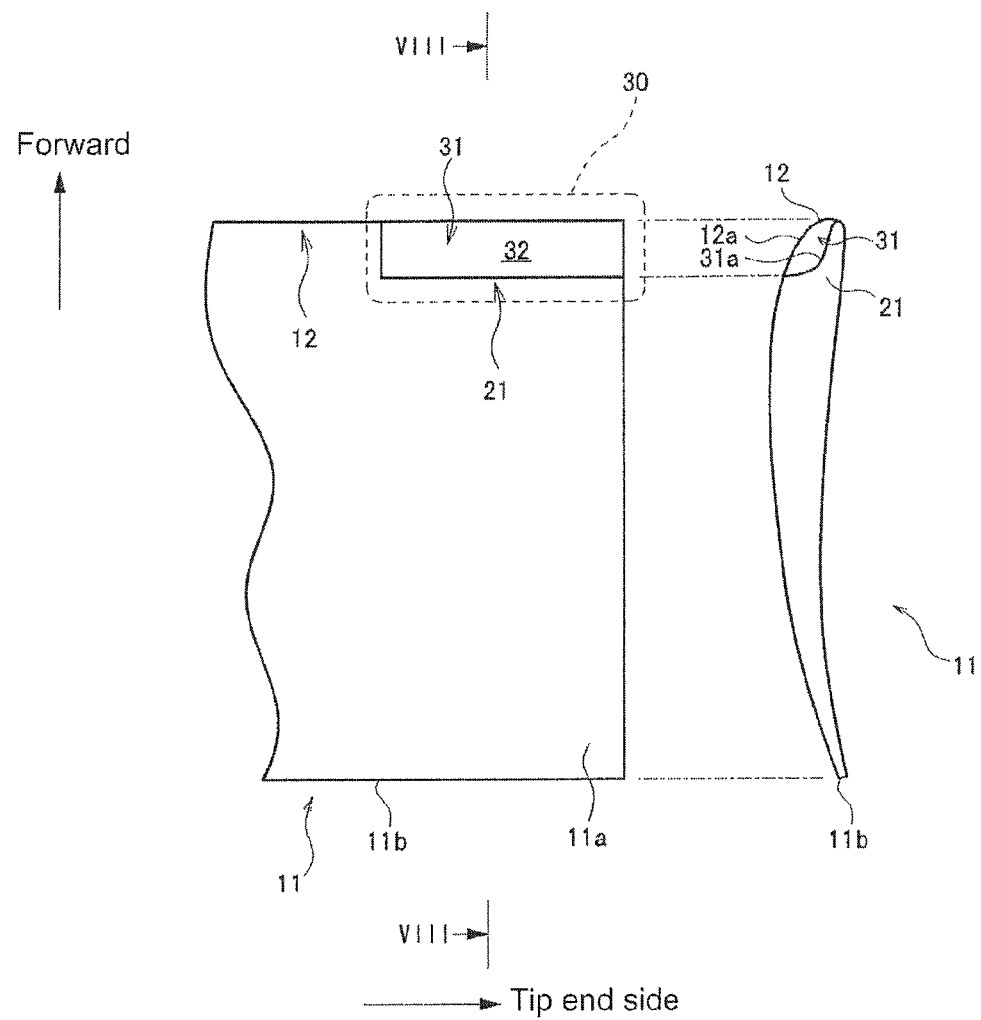
FIG. 7 is a plan view and a side view from the perspective of a tip end, showing the external appearance of the configuration of a flap body of a high-lift device according to Embodiment 2.

FIG. 7 is a plan view and a side view from the perspective of a tip end, showing the external appearance of the configuration of the flap body 11 of the high-lift device 3 according to Embodiment 2. As in Embodiment 1, the flap body 11 of FIG. 7 entirely has a rectangular shape which is elongated in the rightward and leftward direction (wingspan direction) when viewed from above. The tip end portion 11a in the wingspan direction is provided with a gap increasing section 30 formed by depressing a portion of its upper portion.

More specifically, a recess 31 is formed on the upper portion of the leading edge portion (tip end leading edge portion) 21 of the tip end portion 11a of the flap body 11 such that the recess 31 has an upper surface 31a which is depressed relative to the upper surface 12a of the leading edge portion (body leading edge portion) 12 of the remaining portion (portion other than the tip end portion 11a). This recess 31 has a substantially rectangular shape when viewed from above, in which it has a predetermined dimension L3 (preferably, dimension which is equal to or less than 100% of the chord length L) in the wingspan direction and a predetermined dimension L4 from the front end of the tip end leading edge portion 21 (see plan view of FIG. 7). The above gap increasing section 30 is formed by a space 32 formed above the upper surface 31a of the recess 31.

Since the recess 31 is formed on the upper portion of the tip end leading edge portion 21, the thickness of the front end of the tip end leading edge portion 21 is smaller than the thickness of the front end of the remaining body leading edge portion 12.

Figure 8:
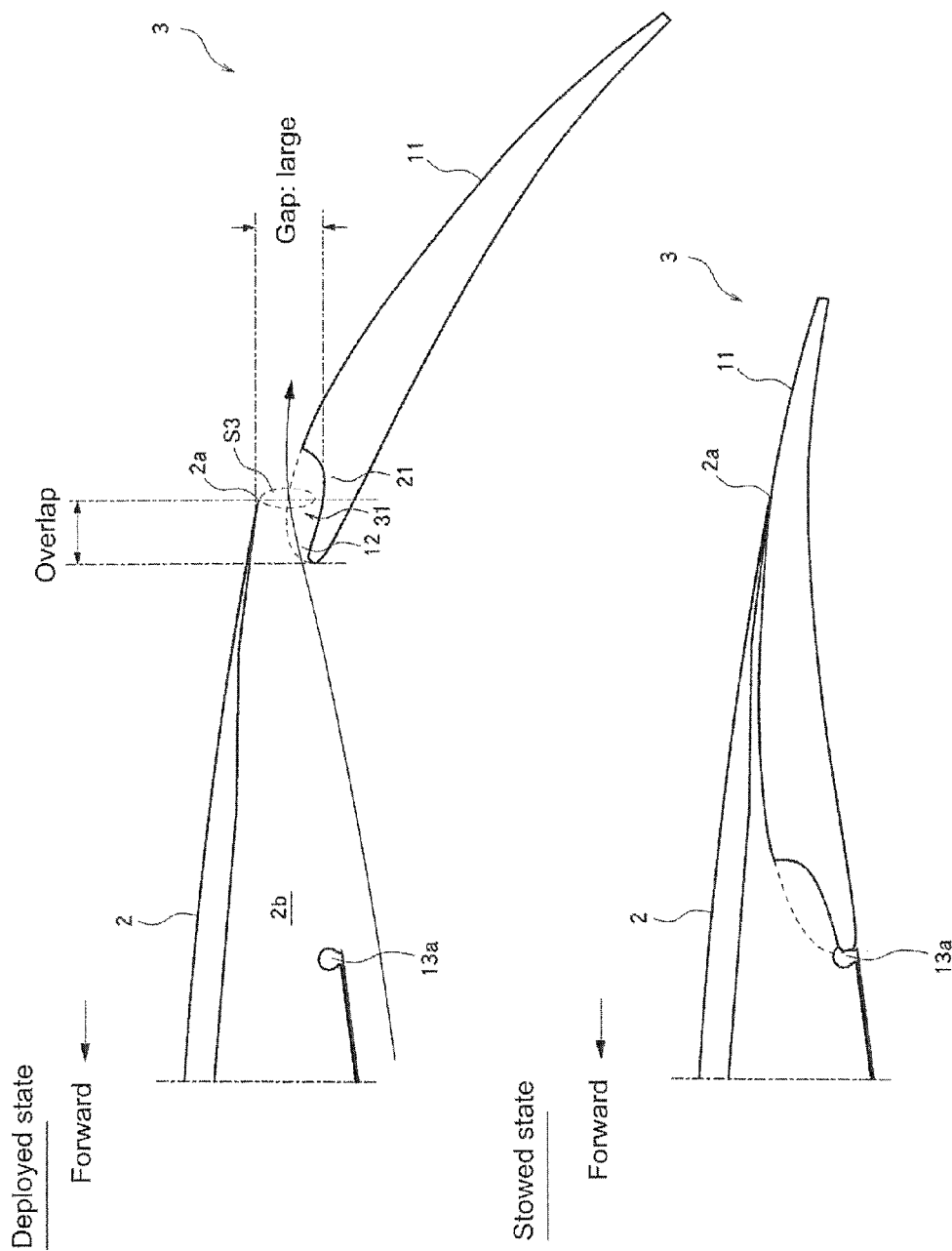
FIG. 8 is a view showing the high-lift device according to Embodiment 2, and showing the cross-section of the flap body taken in the direction of arrows VIII-VIII of FIG. 7.

FIG. 8 is a view showing the high-lift device 3 according to Embodiment 2. FIG. 8 is a cross-sectional view of the main wing 2 and is a cross-sectional view of the flap body 11 taken in the direction of arrows VIII-VIII of FIG. 7 (cross-sectional view of the tip end portion 11a of the flap body 11). On the upper side of FIG. 8, the state in which the flap body 11 is deployed with respect to the main wing 2, is shown, while on the lower side of FIG. 8, the state in which the flap body 11 is stowed in the main wing 2, is shown. A broken line indicates the contour of the body leading edge portion 12.

In the high-lift device 3 of the present embodiment, the airflow travels above the body leading edge portion 12, in the same manner as that described with reference to FIG. 4 in Embodiment 1. In the present embodiment, the airflow travelling above the tip end leading edge portion 21 of the flap body 11 will be described. Because of the presence of the recess 31, a gap which is larger than the gap of the body leading edge portion 12, is formed between the upper surface 31a (upper surface of the recess 31) of the tip end leading edge portion 21 and the lower surface of the trailing edge portion 2a of the main wing 2. Thus, a relatively wide gap S3 is formed between the tip end leading edge portion 21 and the trailing edge portion 2a of the main wing 2.

Therefore, when the flap body 11 is deployed at the time of, for example, landing, the air flowing along the lower surface of the main wing 2 travels through the gap S3 and forms airflow travelling toward the upper surface of the flap body 11 (see solid-line arrow in FIG. 8). This airflow travels through the relatively wide gap S3, and therefore the flow velocity of this airflow is lower than that of the airflow travelling through the gap S1 (see FIG. 4). In addition, the recess 31 mitigates the action for directing the airflow along the upper surface of the flap body 11. Due to these effects, the airflow is locally separated and a pressure decrease is suppressed, on the upper surface of the tip end portion 11a of the flap body 11. Therefore, at the tip end portion 11a, the pressure difference between the upper surface side and the lower surface side becomes small, and hence vortex strength is reduced. As a result, the aerodynamic noise can be reduced.

In the case of using the flap body 11 of the present embodiment, in the state in which the flap body 11 is stowed in the space 2b of the main wing 2, the contour of the whole wing is the same as that of the whole wing which is not provided with the gap increasing section 30. Therefore, in the case of using the flap body 11 having the above configuration, the aerodynamic characteristic of the wing is not affected during the cruising.

Figure 9:
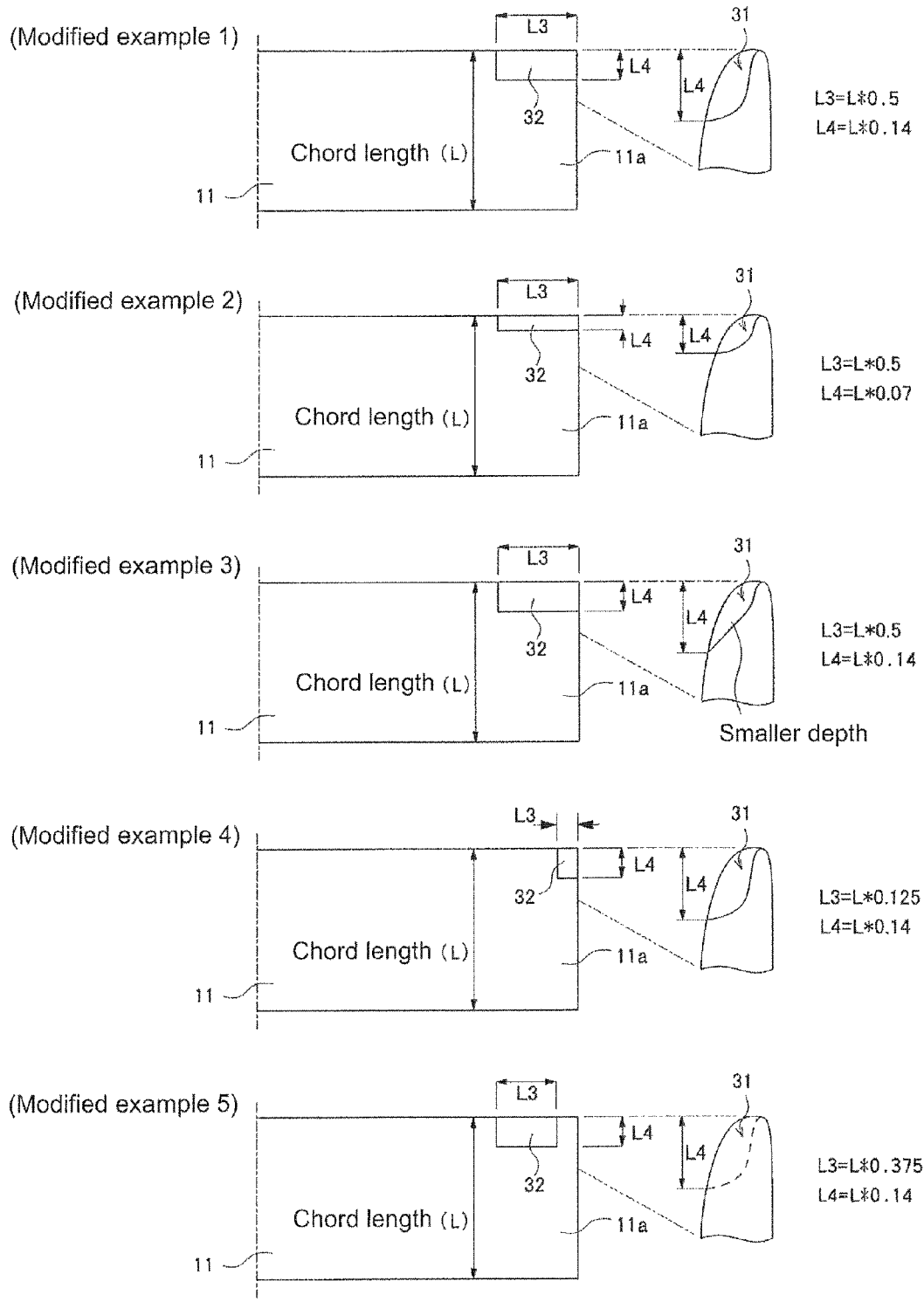
FIG. 9 is a plan view of a flap body and an enlarged side view of a portion of the flap body which portion is in the vicinity of its leading edge portion, according to modified examples of Embodiment 2.

FIG. 9 is a plan view of the flap body 11 and an enlarged side view of a portion of the flap body 11 which portion is in the vicinity of its leading edge, according to modified examples of Embodiment 2. For the gap increasing section 30 according to the present embodiment, the wingspan direction dimension L3 of the recess 31 (i.e., wingspan direction dimension of the space 32), the chord direction dimension L4 of the recess 31 (i.e., chord direction dimension of the space 32), and the location of the gap increasing section 30 can be set to various values.

Specifically, in the gap increasing section 30 of Modified example 1 of FIG. 9, the wingspan direction dimension L3 of the recess 31 is set to about 50% of the chord length L which is closest to the tip end portion 11a of the flap body 11 and the chord direction dimension L4 of the recess 31 is set to about 14% of the chord length L. The space 32 formed by the recess 31 is open at its tip end.

Specifically, in the gap increasing section 30 of Modified example 2, the wingspan direction dimension L3 of the recess 31 is equal to that of Modified example 1 and the chord direction dimension L4 of the recess 31 is set to about 50% of that of Modified example 1 (about 7% of the chord length L). The space 32 formed by the recess 31 is also open at its tip end.

In the gap increasing section 30 of Modified example 3, the dimension L3 and the dimension L4 of the recess 31 are equal to those of Modified example 1, and the depth of the recess 31 is different from that of Modified example 1. Specifically, the depth of the recess 31 is smaller in the gap increasing section 30 of Modified example 3 than in the gap increasing section 30 of Modified example 1. In particular, the gap increasing section 30 of Modified example 3 is configured such that the dimension of a portion of the recess 31 which is in the vicinity of the front end of the tip end leading edge portion 21, is substantially equal to that of Modified example 1, and the depth of the rear portion of the recess 31 is smaller than that of Modified example 1.

In the gap increasing section 30 of Modified example 4, the wingspan direction dimension L3 of the recess 31 is set to about 25% of that of Modified example 1 (about 12.5% of the chord length L), and the chord direction dimension L4 of the recess 31 is equal to that of Modified example 1. The space 32 formed by the recess 31 is also open at its tip end.

In the gap increasing section 30 of Modified example 5, the wingspan direction dimension L3 of the recess 31 is set to about 75% of that of Modified example 1 (about 37.5% of the chord length L), and the chord direction dimension L4 of the recess 31 is equal to that of Modified example 1. Furthermore, the recess 31 of Modified example 5 is placed to be closer to the base end portion than the end surface of the tip end portion 11a is. Therefore, the space 32 formed by the recess 31 is closed at the tip end side. Specifically, this recess 31 is positioned to be deviated closer to the base end from the end surface of the tip end portion 11a of the flap body 11, by a distance of about 12.5% of the chord length L.

With the structures of these modified examples, a pressure decrease on the upper surface of the tip end portion 11a of the flap body 11, can be suppressed. This reduces the pressure difference between the lower surface side and the upper surface side of the tip end portion 11a. Therefore, it becomes possible to mitigate the vortex strength, or suppress generation of the vortex. As a result, the aerodynamic noise can be reduced. When a lift required for the flap body 11 is taken into account, the wingspan direction dimension L1 of the recess 31 is more preferably set to 100% or less of the chord length L of a portion in the vicinity of the space 32, and the chord direction dimension L4 of the recess 31 is more preferably set to 30% or less of the chord length L.

Although in Embodiment 1, the front end line of the body leading edge portion 12 and the front end line of the tip end leading edge portion 21 are substantially parallel to each other, the present invention is not limited to this. For example, the front end line of the tip end leading edge portion 21 may be inclined with respect to the front end line of the body leading edge portion 12. Although in Embodiment 2, the front end line of the body leading edge portion 12 and the rear end line of the recess 31 are substantially parallel to each other, the present invention is not limited to this. For example, the rear end line of the recess 31 may be inclined with respect to the front end line of the body leading edge portion 12.

Figure 10:
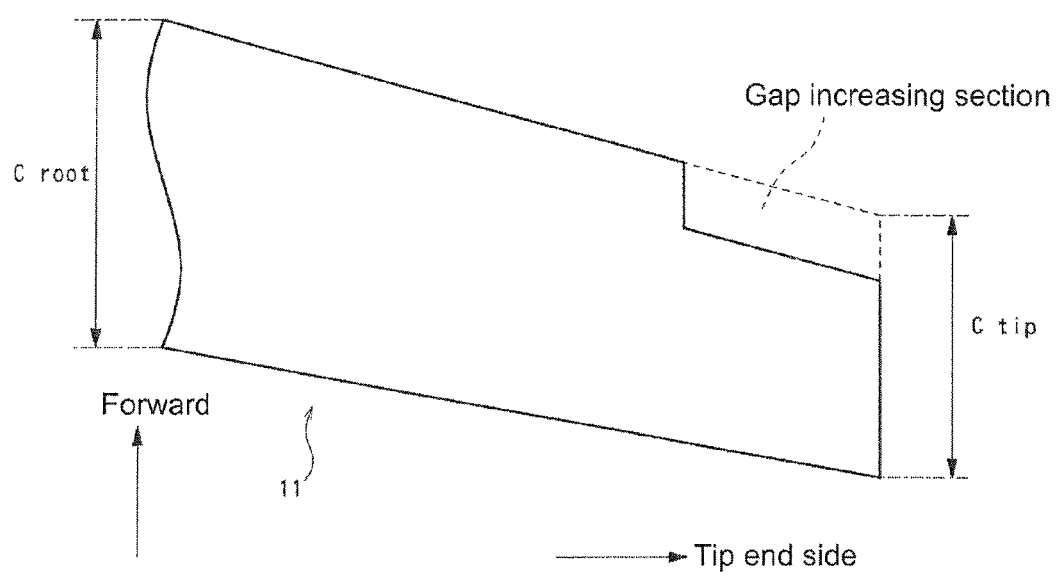
FIG. 10 is a plan view showing the flap body with a tapered portion and a sweptback angle.

FIG. 10 is a plan view showing the flap body with a tapered portion and a sweptback angle, as an example of the flap body 11. As shown in FIG. 10, the planar shape of the flap body 11 is generally a tapered wing or a swept wing (wing shape with a sweptback angle). The tapered wing refers to a wing in which the chord length (C tip) of the tip end of the wing is shorter than the chord length (C root) of the root of the wing. The swept wing refers to a wing in which the tip end position of the wing is deviated rearward relative to the root position of the wing. Even when the present invention is applied to the tapered wing or the swept wing, the advantages similar to those of the above embodiments can be achieved. Specifically, the leading edge portion of the tip end portion of the tapered wing or the swept wing is provided with the gap increasing section formed by the shortened leading edge (Embodiment 1) or the cut leading edge upper surface (Embodiment 2). Thus, it becomes possible to effectively reduce the noise while lessening the effects on the aerodynamic performance during takeoff and landing.

In brief, it is sufficient that the pressure difference between the upper surface and the lower surface of the flap body 11 can be reduced by separating from the upper surface, the airflow traveling on the upper surface side of the flap body 11. To achieve this, the flap body 11 may be configured to have the gap increasing section for increasing the gap between the trailing edge portion 2a of the main wing 2 and the tip end leading edge portion 21 of the flap body 11 such that this gap is larger than the gap S1 corresponding to the body leading edge portion 12 of the flap body 11.

Figure 11:
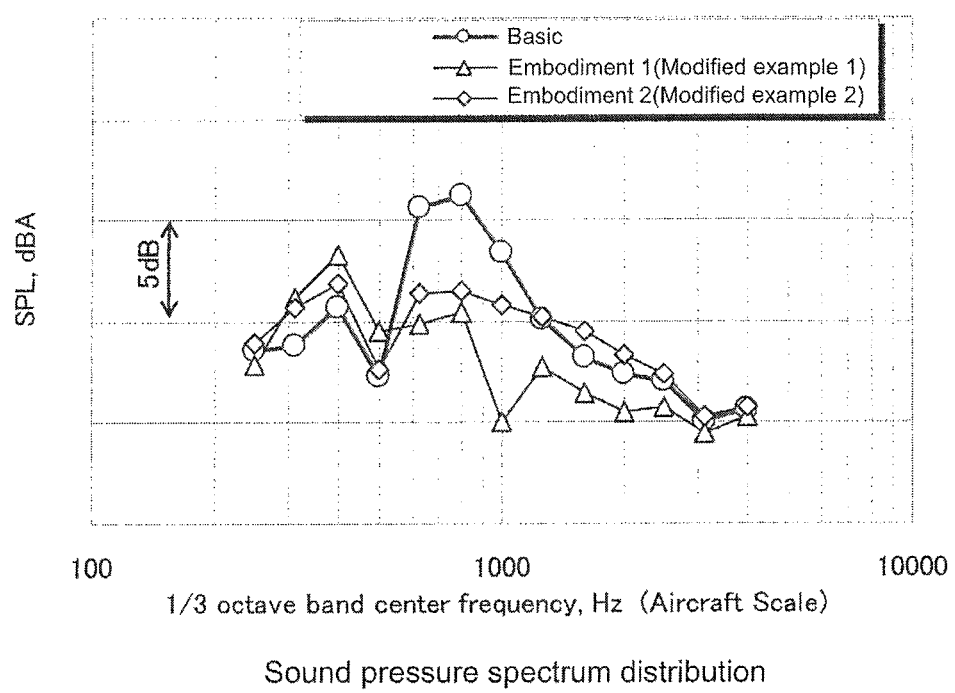
FIG. 11 is a graph showing results of measurements of spectrum distributions of a sound pressure, regarding the flap bodies.

FIG. 11 is a graph showing results of measurements of spectrum distributions (i.e., frequency characteristic) of a sound pressure by wind tunnel testing, for the flap bodies with three kinds of shapes. FIG. 11 shows the flap body (in FIG. 11, basic) which is not provided with the gap increasing section, the flap body of Modified example 1 of Embodiment 1, and the flap body of Modified example 1 of Embodiment 2. Note that the sound pressure level on a vertical axis is obtained by compensating the sound pressure level into A characteristic, while the frequency on a horizontal axis is obtained by compensating the frequency assuming a particular actual aircraft size.

As can be seen from FIG. 11, the sound pressure level is lower in the flap bodies of Embodiment 1 and Embodiment 2 than the flap body of the basic shape. In particular, it can be seen that in the flap bodies of Embodiment 1 and Embodiment 2, the sound pressure level is lowered in the vicinity of 800 Hz in which the effects on the noise are high.

Figure 12:
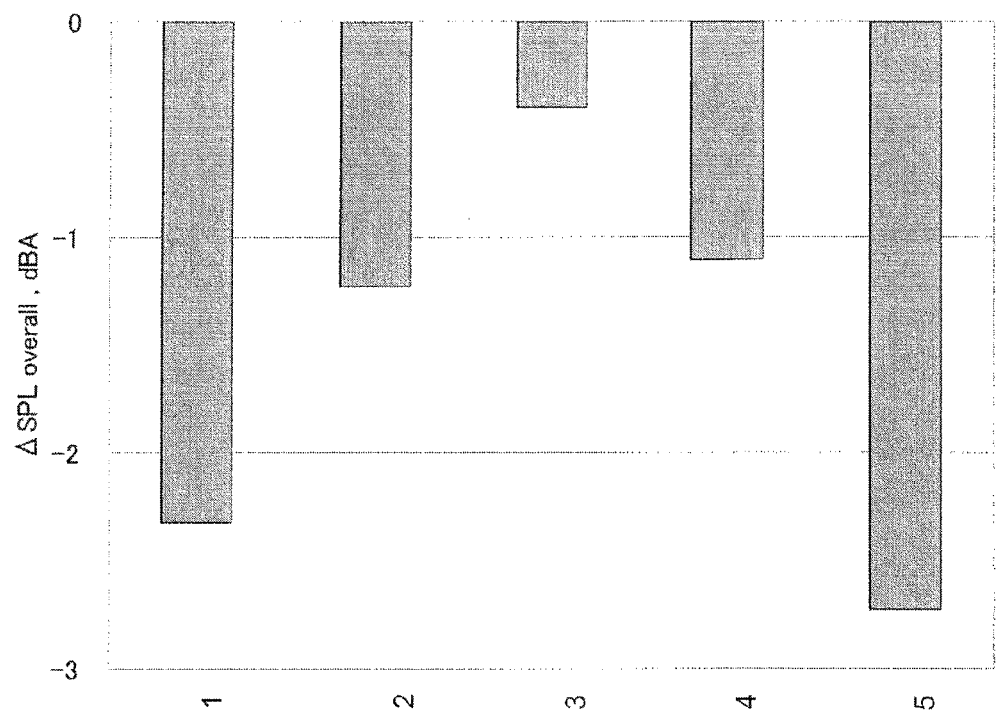
FIG. 12 is a graph showing sound pressure levels (overall values) of the flap bodies of modified examples 1 to 5 of Embodiment 1.
Figure 13:
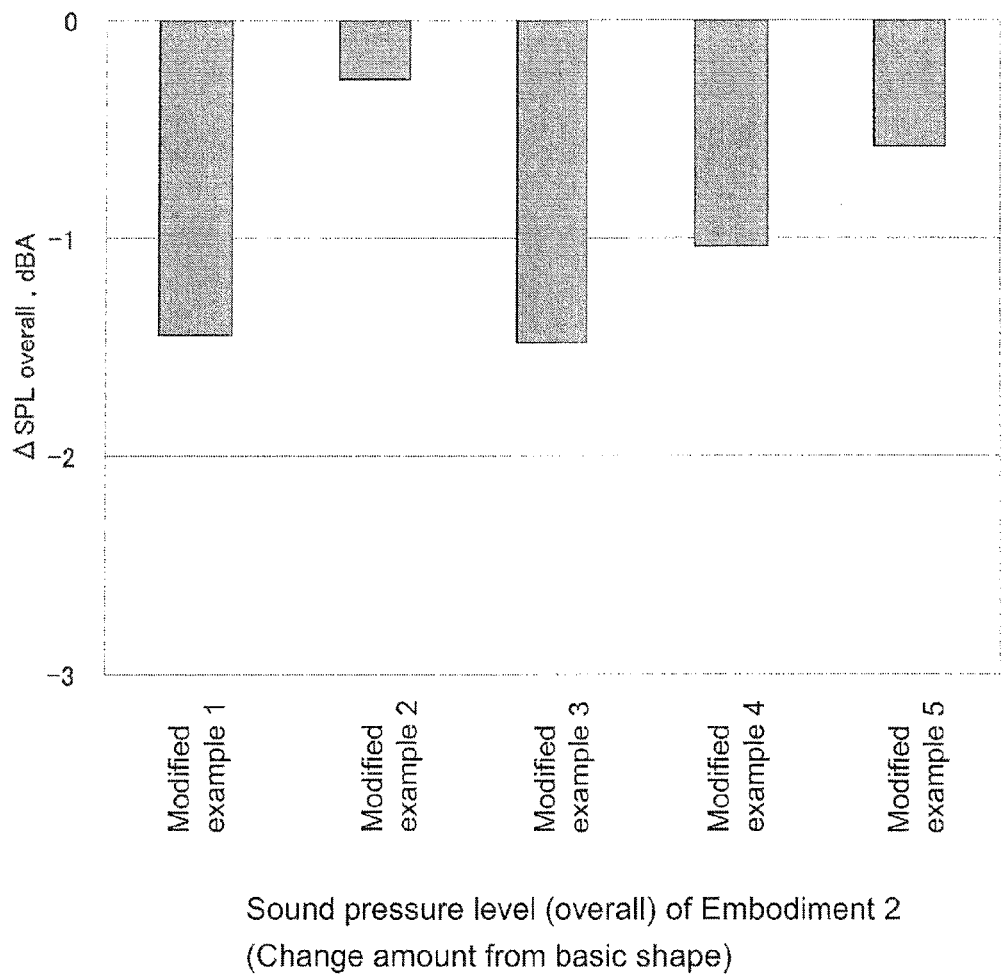
FIG. 13 is a graph showing sound pressure levels (overall values) of the flap bodies of modified examples 1 to 5 of Embodiment 2.

FIG. 12 is a graph showing sound pressure levels (overall values) of the flap bodies of modified examples 1 to 5 of Embodiment 1. FIG. 13 is a graph showing sound pressure levels (overall values) of the flap bodies of modified examples 1 to 5 of Embodiment 2. Each of these values indicates a change amount with respect to the sound pressure level (overall value) of the flap body with the basis shape, and is calculated based on the measurement values by the wind tunnel testing.

As described above, in accordance with the high-lift device of the air vehicle of the present invention, the noise can be reduced significantly merely by changing the shape of a portion (very small portion relative to the whole area of the flap body) of the flap body. Specifically, the shape of the end portion of the flap body in the wingspan direction (extending direction) is changed, and only the leading edge portion of the end portion is changed. Because of this, it becomes possible to effectively reduce the noise while lessening the effects on the aerodynamic performance during takeoff and landing.

In general, spars which are structural members extend in the wingspan direction inside the flap body. Since only the shape of the leading edge portion of the end portion is changed as described above, the layout of the spars is not affected. This eliminates a need for changing the layout of the spars in the existing flap body. Also, it becomes possible to avoid a situation in which the spars discontinue in the vicinity of the tip end portion 11a, or separate spars are provided at at the tip end portion 11a, and as a result, the weight increases.

Furthermore, in the high-lift device of the present invention, the gap increasing section for realizing reduction of the noise has a very simple shape, and does not have a complex mechanism and a complex shape. Therefore, an increase in the weight does not occur and maintenance can be carried out easily. Moreover, as described above, the shape which is similar to the conventional wing shape can be realized in the state in which the flap body is stowed in the main wing. Therefore, the aerodynamic characteristics are not effected during cruising.

As described above, the high-lift device of the present invention is capable of reducing noise significantly while lessening effects on the aerodynamic characteristics of the whole wing, is improved in design, manufacture, and maintenance, and is highly practical.

INDUSTRIAL APPLICABILITY

The present invention has advantages that it becomes possible to suitably reduce aerodynamic noise radiated from a high-lift device without substantially increasing the weight of a fuselage and degrading practical performance, and is effectively applied to an air vehicle including the high-lift device.

REFERENCE SIGNS LIST 1 fuselage
2 main wing
3 high-lift device
11 flap body
12 body leading edge portion
20 gap increasing section
21 tip end leading edge portion
22 space
30 gap increasing section
31 recess
32 space

The invention claimed is:
1. A high-lift device of an air vehicle, the high-lift device comprising:
a flap body which is provided at a rear portion of a main wing of the air vehicle such that the flap body is deployed with respect to the main wing and stowed in the main wing and extends along a wingspan direction of the main wing,
wherein the flap body includes a tip end portion which is an end portion in an extending direction of the flap body, and a body portion which is a portion other than the tip end portion; and
a gap section provided in front of a leading edge portion of the tip end portion and vertically penetrating the flap body, the leading edge portion of the tip end portion being located rearward relative to a leading edge portion of the body portion, and a chord direction dimension of the tip end portion being set smaller than a chord direction dimension of the body portion, to increase a gap between the rear portion of the main wing and a front portion of the tip end portion of the flap body in such a manner that the gap is larger than a space between the rear portion of the main wing and the front portion of the body portion in a state in which the flap body is deployed, the gap section provided so that air flowing along a lower surface of the main wing travels through the gap toward an upper surface of the flap body to weaken a swirling vortex from a lower surface of the flap body to an upper surface of the flap body, at the tip end portion of the flap body,
wherein the gap section is open on a tip end portion side of the flap body.

* * * * *